(12) United States Patent
Glab et al.

(10) Patent No.: US 6,511,397 B2
(45) Date of Patent: Jan. 28, 2003

(54) METHOD AND APPARATUS FOR CONTROLLING A TRANSFER CASE WHICH REACTS TO RATE OF CHANGE OF THROTTLE POSITION

(75) Inventors: John Glab, Riverview, MI (US); Ashok Rodrigues, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/774,150

(22) Filed: Jan. 30, 2001

(65) Prior Publication Data

US 2002/0103054 A1 Aug. 1, 2002

(51) Int. Cl.[7] .............................................. B60K 41/04
(52) U.S. Cl. ........................ 477/36; 477/175; 180/247
(58) Field of Search ..................... 477/36, 175, 180, 477/179; 180/247, 233

(56) References Cited

U.S. PATENT DOCUMENTS

| | | | | |
|---|---|---|---|---|
| 4,754,834 A | * | 7/1988 | Ozaki et al. ................... | 477/36 |
| 4,776,424 A | * | 10/1988 | Naito ........................... | 477/36 |
| 5,010,974 A | * | 4/1991 | Matsuda ...................... | 180/247 |
| 5,289,895 A | * | 3/1994 | Takata et al. ................ | 180/248 |
| 6,132,332 A | * | 10/2000 | Yasui ........................... | 477/36 |

* cited by examiner

Primary Examiner—Ankur Parekh
(74) Attorney, Agent, or Firm—F. G. McKenzie

(57) ABSTRACT

A transfer case control system or apparatus 10 is provided for use on a four-wheel drive vehicle of the type having a transfer case 32, a front driveshaft 22 and a rear driveshaft 26. Transfer case control system 10 includes a conventional microcontroller or controller 40 having a memory unit 42 and operating under stored program control. Controller 40 is communicatively coupled to sensors 44, 46, 48, and to transfer case 32. Controller 40 selectively transmits a torque control or "boost torque" signal to transfer case 32, based upon the rate of change of the vehicle's throttle position and the speed of driveshafts 22, 26.

15 Claims, 3 Drawing Sheets

METHOD AND APPARATUS FOR CONTROLLING A TRANSFER CASE WHICH REACTS TO RATE OF CHANGE OF THROTTLE POSITION

FIELD OF THE INVENTION

This invention relates to a method for controlling a transfer case and more particularly, to a method for controlling a transfer case within a four wheel drive vehicle which provides an improved response by monitoring and reacting to the gradient or the rate of change of the position of the vehicle's throttle.

BACKGROUND OF THE INVENTION

Four-wheel drive vehicles typically include a transfer case which selectively transfers torque and power from the vehicle's input shaft to a front and a rear driveshaft, thereby selectively rotating the front and rear driveshafts. The transfer case includes a conventional electromagnetic clutch assembly which typically and selectively transfers torque from a primary driveshaft (e.g., the rear driveshaft) to a secondary driveshaft (e.g., the front driveshaft), thereby reducing the torque provided to the primary driveshaft and increasing the torque provided to the secondary driveshaft. The clutch assembly is typically and communicatively coupled to a controller and/or control system which determines the amount of torque that is to be provided to the front and rear driveshafts based upon vehicle sensory data, and which generates a command signal to the clutch assembly, thereby controlling the amount of torque which is provided to front and rear driveshafts. Particularly, in order to provide torque and traction to the front and rear wheels of the vehicle and to avoid relative slip between the front and rear wheels, the transfer case controller and/or control system typically monitor the speed of both the front and rear driveshafts and the position of the vehicle's throttle (i.e., "throttle position").

While these types of prior systems provide sufficient traction and control to the front and rear wheels of a vehicle in many situations, they suffer from some drawbacks. One drawback associated with these prior systems is that they typically monitor and react to the throttle position (i.e., the currently sensed or measured position of the throttle), and do not monitor the rate of change or gradient of the throttle position. Hence, these systems do not adequately account for or react to relatively rapid movements of the vehicle's throttle, which are of a relatively short duration (e.g., short bursts of acceleration or deceleration). In these types of situations, prior systems often allow slippage to occur between the front and rear wheels of the vehicle, or cause and/or suffer from undesirable noise and vibration harshness ("NVH") difficulties, which are perceived by the operator and/or passengers of the vehicle.

There is therefore a need for a method and an apparatus for controlling a transfer case within a four-wheel drive vehicle which provides an improved response by monitoring and reacting to the rate of change of the position of the vehicle's throttle.

SUMMARY OF THE INVENTION

A first advantage of the invention is that it provides a method and an apparatus for controlling a transfer case within a four-wheel drive vehicle which overcomes at least some of the previously delineated drawbacks of the prior systems, devices, and/or methods.

A second advantage of the invention is that it provides a method and an apparatus for controlling a transfer case within a four-wheel drive vehicle which monitors and desirably reacts to the rate of change of the position of the vehicle's throttle.

A third advantage of the invention is that it provides a method and an apparatus for controlling a transfer case within a four-wheel drive vehicle which is effective to substantially prevent slippage between the front and rear wheels of the vehicle during short bursts of acceleration or deceleration in a manner which does not result in undesirable NVH problems.

According to one aspect of the present invention, a system for controlling a transfer case is provided. The transfer case is operatively disposed within a four-wheel drive vehicle of the type having a selectively positionable throttle and a front and a rear driveshaft. The transfer case is effective to selectively transfer torque to the front driveshaft and to the rear driveshaft. The system includes a sensor which senses a first and a second position of the throttle and which generates at least one signal representing the sensed first and second position; and a controller which is communicatively coupled to the transfer case and to the sensor. The controller receives the at least one signal and utilizes the at least one signal to calculate a rate of change of throttle position. The controller is further adapted to selectively generate an output signal based upon the rate of change of throttle position, the output signal being effective to selectively control the torque which is transferred to the front and rear driveshafts.

According to a second aspect of the present invention, a method for controlling a transfer case is provided. The transfer case is operatively disposed within a four wheel drive vehicle of the type having a selectively positionable throttle which changes position by a certain amount during an interval of time, a front driveshaft and a rear driveshaft. The transfer case is adapted to selectively provide torque to the front driveshaft and the rear driveshaft. The method includes the steps of measuring the certain amount; using the certain amount to calculate a rate of change of the position of the throttle; comparing the calculated rate of change of the position of the throttle to a rate threshold value; and selectively providing a boost torque signal to the transfer case when the rate of change of the position of the throttle exceeds the rate threshold value, the boost torque signal being effective to alter the torque provided to the front driveshaft and the rear driveshaft.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
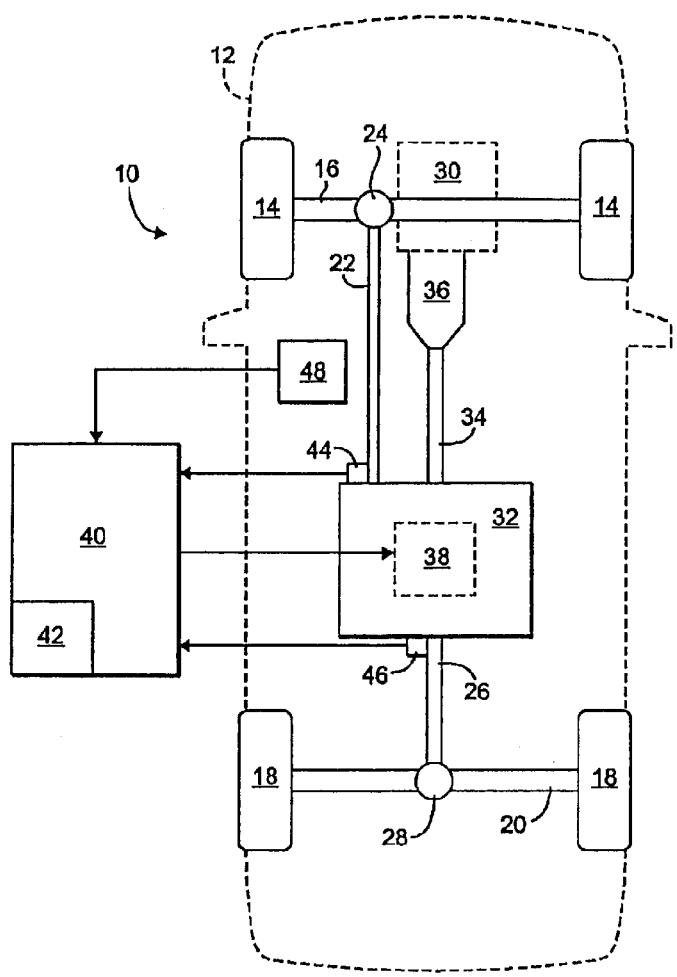
FIG. 1 is a schematic diagram of a four-wheel drive vehicle including a control system which incorporates the teachings of the preferred embodiment of the invention and employed on a vehicle.

Referring now to FIG. 1, there is shown a transfer case control system or apparatus 10 made in accordance with the teachings of the preferred embodiment of the invention. As shown, system 10 is deployed upon a four-wheel drive vehicle having a pair of front wheels 14 which are operatively mounted upon a front axle 16, and a pair of rear wheels 18 which are operatively mounted upon a rear axle 20. Front axle 16 is operatively coupled to and receives torque and power from a front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle engine 30 through the transfer case 32. Particularly, torque and/or power generated by the engine 30 is delivered to transfer case 32 through an input shaft 34 which is coupled to the transmission system or assembly 36. Transfer case 32 includes a conventional electromagnetic clutch assembly 38 which selectively provides torque to the front driveshaft 22 and to the rear driveshaft 26. In the preferred embodiment of the invention, clutch assembly 38 is a conventional "torque-on-demand" type clutch assembly. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as the primary driveshaft).

Transfer case control system 10 includes a conventional microcontroller or controller 40 having a memory unit 42 and operating under stored program control. Controller 40 is electrically, physically, and communicatively coupled to sensors 44, 46, 48, and to clutch assembly 38. Controller 40 receives signals generated by sensors 44–48, processes and utilizes the received signals to determine the amount of torque which is to be respectively provided to front and rear driveshafts 22, 26, and based upon this determination, generates a command signal to selectively activate the clutch assembly 38, thereby providing torque to and smoothly releasing torque from the front driveshaft 22 and/or rear driveshaft 26.

In the preferred embodiment, controller 40 is a conventional powertrain controller including one or more microprocessors and subprocessors which cooperatively perform the below-described calculations, subroutines and/or processes. Controller 40 generates a pulse-width-modulated ("PWM") signal which controls the amount of slippage between plates of the clutch assembly 38, thereby controlling the amount of torque and power which is transferred to front driveshaft 22 and rear driveshaft 26 from the input shaft 34. Particularly, the duty cycle percentage of the PWM signal (i.e., the amount or percentage of a signal period in which the signal is active or "enabled") controls the amount of torque which is being transferred to the respective driveshafts 22, 26. The output signal of the controller 40 to the clutch assembly 38 is discussed interchangeably herein as a "duty cycle" output and/or as "torque" output signal.

In the preferred embodiment of the invention, memory 42 is a conventional memory unit including both permanent and temporary memory, and is adapted to and does store at least a portion of the operating software which directs the operation of controller 40. Moreover, memory 42 is adapted to selectively store other types of data or information, including information associated with the operation of the preferred embodiment of the invention and/or associated historical data, processing data, and/or operational data. As will be more fully discussed below, examples of such data include, but are not limited to, data relating to the speed of driveshafts 22, 26, throttle position values, throttle rate values, and other engine operating data, which are used by controller 40 to determine the amount of torque that should be provided to driveshafts 22, 26. Memory 14 also stores various threshold values which are utilized to calculate a throttle position minimum duty cycle and a throttle rate "boost torque" or minimum duty cycle. These values are preferably held within one or more matrixes or database tables which are stored within memory 42. As should also be apparent to those of ordinary skill in the art, controller 40 and memory 42 may actually comprise several commercially available, conventional, and disparate chips or devices, which are operatively and communicatively linked in a cooperative manner.

Sensors 44 and 46 comprise conventional and commercially available sensors which respectively measure the rotational speed of the front driveshaft 22 and the rear driveshaft 26, and which each generate and communicate a signal representing each of these measured speeds to controller 40. In an alternate embodiment, sensors 44, 46 can be replaced with wheel speed sensors. Sensors 48 comprise conventional and commercially available vehicle operating condition sensors, and in the preferred embodiment, sensors 48 comprise at least one throttle position sensor which measures and/or detects the position of the vehicle's throttle and which transmits a signal representing this position to controller 40. In the preferred embodiment of the invention, sensors 48 also include one or more conventional engine or vehicle speed and/or acceleration sensors, and one or more "fault" detection sensors, which detect faults or abnormalities in the operation of engine 30 or in the operation of the other components of vehicle 12. In one non-limiting embodiment, sensors 48 may include a throttle rate sensor.

Sensors 44–48 provide data representing the above-delineated measured values to controller 40, which utilizes these values, in a known and conventional manner, to generate a PWM signal to transfer case 32 and/or clutch assembly 38, thereby selectively controlling the power and torque which is provided to driveshafts 22 and 26. It should be appreciated that sensors 44–48 may include filtering and/or processing devices or circuits (e.g., low pass, high pass, and/or band pass filters) which filter and/or process the measured or sensed data prior to sending the data to controller 40.

Figure 2:
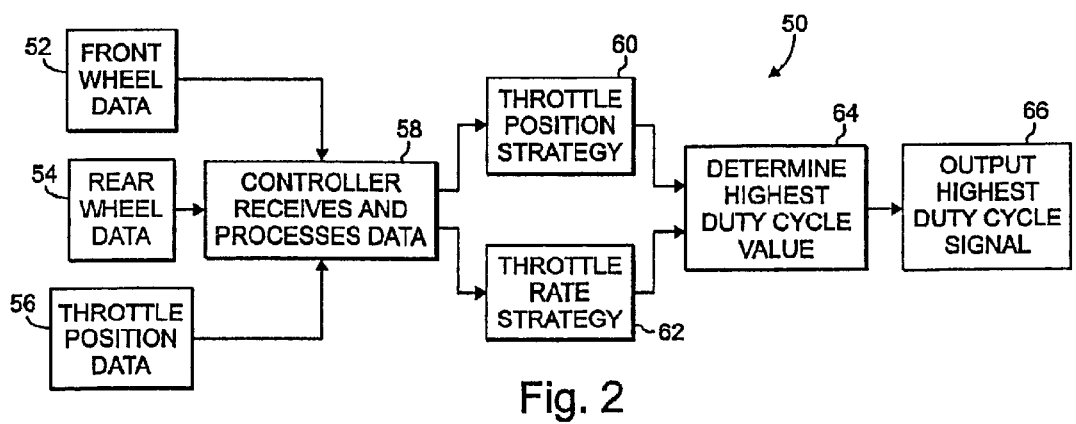
FIG. 2 is a block diagram illustrating the broad functionality of the control system shown in FIG. 1.

To understand the general operation of system 10, reference is now made to flow chart 50 of FIG. 2, illustrating the broad functionality of system 10. As shown, data 52 represents the average speed of the front wheels 14, which is derived in a known manner from the measurements taken by sensor 44. Particularly, controller 40 processes drive shaft speed data received from sensor 44 and uses conventional algorithms and/or equations to determine and/or estimate the average speed of the vehicle's front wheels 14. Data 54 represents the average speed of the rear wheels 18, which is derived in a known manner from the measurements taken by sensor 46 (i.e., in a manner substantially identical to that described with respect to data 52). Data 56 represents other data relating to and/or representing the current position of the vehicle's throttle which is measured and/or processed by sensors 48.

As illustrated in block 58, the controller 40 receives and processes the data 52–56 and transmits or enters this data into a throttle position strategy, procedure, subroutine or subprocessor 60, and a throttle rate strategy, procedure, subroutine or subprocessor 62. In the preferred embodiment, subroutines or subprocessors 60 and 62 are both contained or programmed within controller 40 and/or are executed by controller 40. In other non-limiting embodiments, subroutines and/or subprocessors 60 and 62 are contained within chips, circuits and/or other devices which are external to controller 40.

Subroutines or subprocessors 60 and 62 each utilize the received data 52–56 to selectively generate a respective minimum duty cycle value which is transmitted to an "arbitrating" subroutine, strategy, or subprocessor, as illustrated in functional block or step 64. The "arbitrating" procedure determines which of the two minimum duty cycle values (i.e., the throttle position minimum duty cycle or the throttle rate "boost torque") is higher (i.e., in percentage) and outputs the higher of the minimum duty cycle value or "boost torque" value to the transfer case 32 and/or clutch assembly 38, as illustrated in functional block or step 66. The "boost torque" or duty cycle causes the clutch assembly 38 to alter or control the amount of torque which is being provided to the front and rear driveshafts, thereby preventing slippage between wheels 14 and 18, and providing additional traction to wheels 14 and 18 when the controller anticipates a potential "slip condition". In one non-limiting embodiment, the higher of the two values is further compared with a "slip control" signal's duty cycle value, which is derived in a conventional manner using a separate subroutine and/or subprocessor and the respective front and rear shaft speeds. In this non-limiting embodiment, the throttle position and/or rate signal is only communicated to the clutch assembly 38 if the output signal's duty cycle value exceeds the slip control signal's duty cycle value.

In the preferred embodiment of the invention, the throttle position strategy, procedure, subroutine or subprocessor 60 utilizes a conventional matrix or database table which is stored within memory 42. Particularly, the table or matrix provides a plurality of minimum duty cycle values that are each based upon or correspond to a vehicle speed value or range of values, and a throttle position value or range of values. The current vehicle speed, which is measured and calculated using the "slower" of the two driveshafts 22, 26, and the current throttle position are used to "reference" the matrix or database table, thereby providing a corresponding throttle position minimum duty cycle, which is communicated to arbitrator 64.

Figure 3:
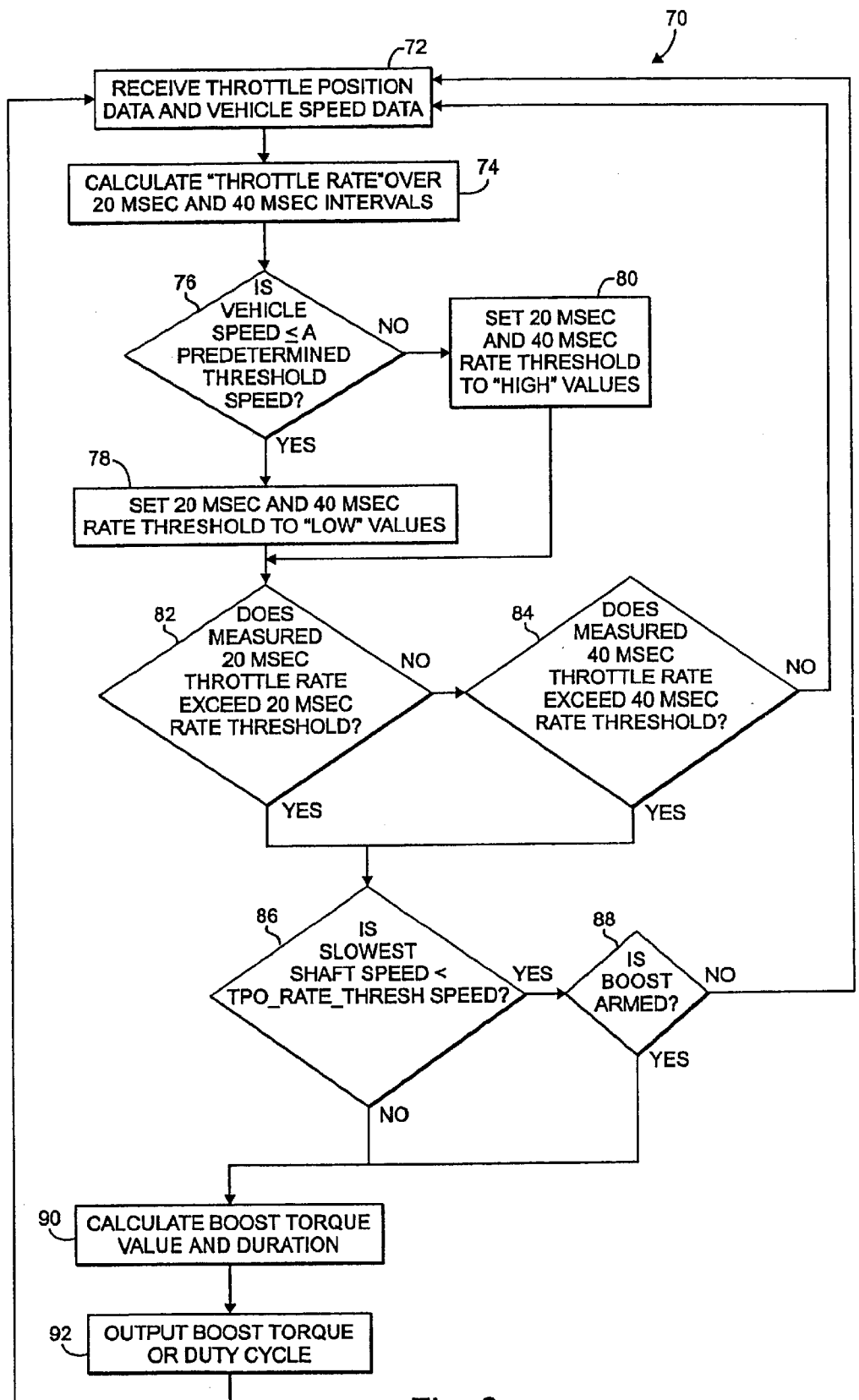
FIG. 3 is a block diagram illustrating the detailed operational functionality of the throttle rate sub-processor utilized by the control system shown in FIG. 1.

Referring now to FIG. 3, the operational flow diagram or "flow chart" 70 illustrates the operational functionality of the throttle rate strategy, subroutine or subprocessor 62. As shown in functional block or step 72 of flow diagram 70, the throttle rate subroutine or subprocessor 62 receives the throttle position data (e.g., data 56) and the vehicle or driveshaft speed data (i.e., data 52 and 54). In functional block or step 74, controller 40 (e.g., subroutine or subprocessor 62) calculates the rate of change of the position of the vehicle's throttle (i.e., the "throttle rate") over a 20 millisecond (msec) interval and over a 40 msec interval (e.g., controller 40 determines the "difference" between a first throttle position value and a second throttle position value, which is measured 20 msec after the first value is measured, and between the first throttle position value and a third throttle position value, which is measured 40 msec after the first value is measured). In alternate embodiments, different or additional time periods or intervals having different lengths may be used. In one non-limiting embodiment, only a single interval and throttle rate value are calculated and used. As illustrated in functional block or step 76, the controller 40 next determines whether the vehicle speed, as measured and calculated by use of the slower of the two driveshafts 22, 36 (e.g., the slower of the two speeds which are derived from data 52 and data 54), is less than or equal to a predetermined threshold speed. If the vehicle speed is less than the threshold speed, a 20 msec rate threshold and a 40 msec rate threshold are each set or made equal to a respective and predetermined "low" value, as illustrated in functional block or step 78. Otherwise, the 20 msec and 40 msec threshold rate values are each set to a respective and predetermined "high" value, as illustrated in functional block or step 80. By using both a set of "high" rate threshold values and a set of "low" rate threshold values, system 10 is able to react to, consider, and/or account for the varying potential for slip which is a function of or which depends upon both the vehicle speed and the vehicle's acceleration rate. In the preferred embodiment of the invention, these "high" and "low" rate threshold values are established through data that is acquired from testing the type of transfer case which is being controlled. In one non-limiting embodiment, the transfer case is tested by monitoring the vehicle for slip conditions while introducing various controlled or "known" speed and acceleration values.

Once the 20 msec and 40 msec rate thresholds have been set or established, controller 40 proceeds to functional block or step 82, and determines whether the current 20 msec throttle rate, which is measured and/or calculated in step 74, exceeds the 20 msec rate threshold. If the current 20 msec throttle rate exceeds the 20 msec rate threshold, controller 40 proceeds to functional block or step 86. Otherwise, controller 40 determines whether the current 40 msec throttle rate, which is measured and/or calculated in step 74, exceeds the 40 msec rate threshold. If the current 40 msec throttle rate exceeds the 40 msec rate threshold, controller 40 proceeds to functional block or step 86. Otherwise, the throttle rate subroutine or subprocessor 62 does not produce, "fire" or output a "boost torque" signal and returns to functional block or step 72.

If either the 20 msec rate threshold or the 40 msec rate threshold is exceeded, controller 40 proceeds to step 86. In step 86, controller 40 determines whether the vehicle's speed (as determined by the slowest shaft speed) is less than a tpo_rate_threshold speed. If the vehicle speed has not fallen below a tpo_rate_threshold speed, controller 40 proceeds directly to step 90. Otherwise, controller 40 proceeds to step 88 and determines whether a boost enable flag stored within controller 40 has been armed (the strategy for arming and disarming of the boost enable flag is discussed more fully and completely below). If the boost enable flag is not armed, controller 40 returns to step 72. If the boost enable flag is armed, controller 40 proceeds to step 90.

In step 90, controller 40 calculates a "boost torque" duty cycle value (e.g., the duty cycle percentage of the "boost torque" signal) and a "boost torque" duration (e.g., the duration in seconds or milliseconds that the "boost torque" signal will last). In the preferred embodiment of the invention, the "boost torque" duty cycle value and duration are predetermined values and are each based upon the rate threshold that was exceeded (e.g., if a "high" rate threshold was exceeded, the "boost torque" signal is set equal to a "high" duty cycle value and the duration is set equal to a "high" duration, and a if a "low" rate threshold was exceeded, the "boost torque" signal is set equal to a "low" duty cycle value and the duration is set equal to a "low" duration). In another non-limiting embodiment of the invention, the "boost torque" duty cycle value is determined as a function of the current measured and/or calculated speed and throttle rate. In yet another non-limiting embodiment of the invention, the "boost torque" duty cycle value is determined based upon an amount by which the throttle rate exceeds the rate threshold.

In functional block or step 92, the throttle rate "boost torque" or duty cycle is outputted or transmitted to the arbitrating subroutine, illustrated in functional block or step 64 of FIG. 2, and/or to the clutch assembly 38. Controller 40 then proceeds to functional block or step 72 and repeats the foregoing procedure.

Figure 4:
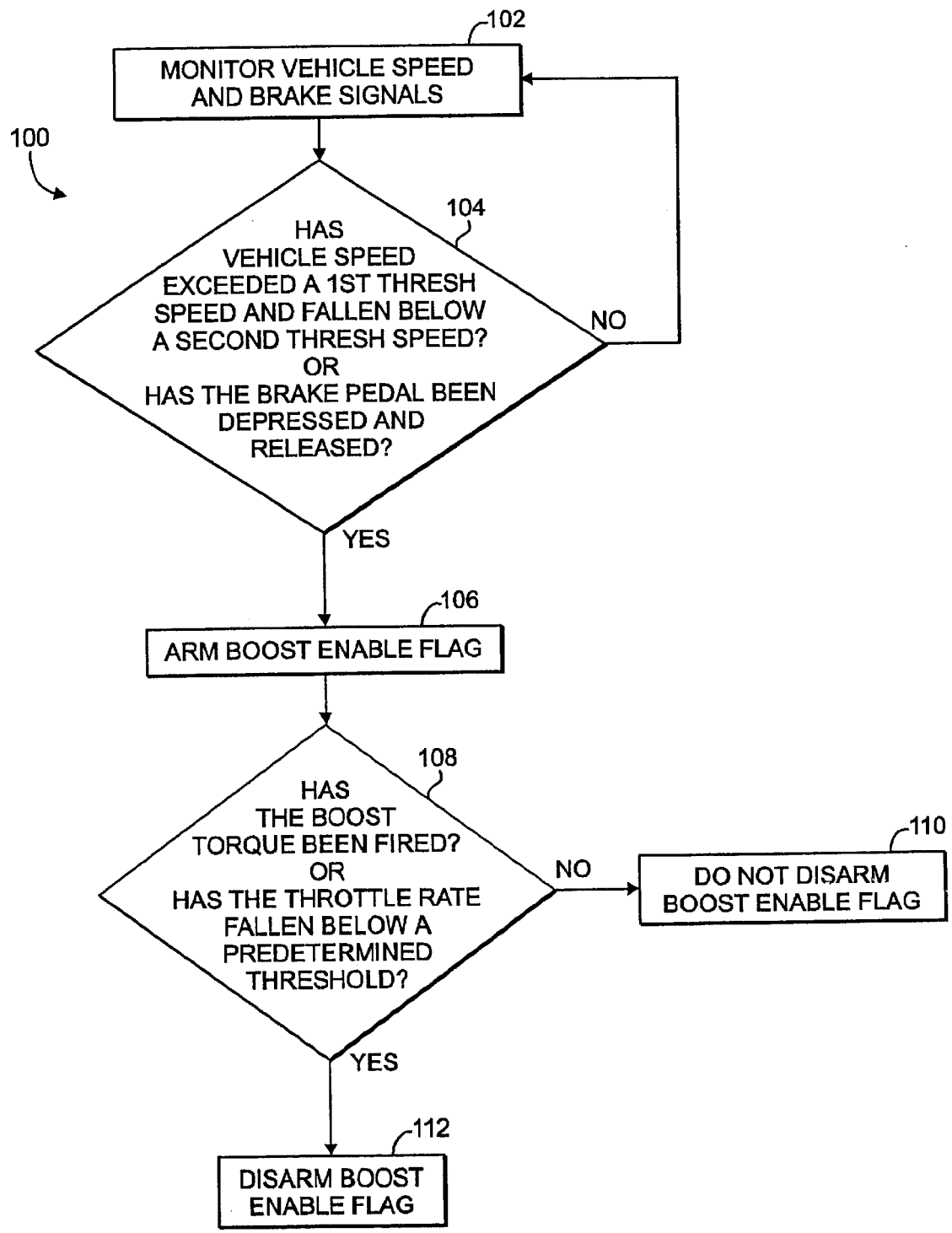
FIG. 4 is a block diagram illustrating a strategy for arming and disarming a boost enable flag.

Referring now to FIG. 4, there is shown one non-limiting example of a strategy 100 which is used by controller 40 to selectively arm and disarm the boost enable flag. Strategy 100 begins with step 102, where controller 40 monitors the vehicle's speed (e.g., as determined by the slowest shaft speed) and the vehicle's braking signals. In step 104, controller 40 determines whether (i) the vehicle's speed has exceeded a first threshold value and has subsequently fallen below a second threshold value, or (ii) the vehicle's brake pedal has been depressed and subsequently released. If neither condition (i) nor condition (ii) has occurred, controller 40 returns to step 102. Otherwise, if either of the conditions (i) or (ii) has occurred, controller 40 proceeds to step 106 and arms the boost enable flag. In step 108, controller 40 determines whether to disarm or disable the boost enable flag. Particularly, controller 40 determines whether (i) the boost torque has been fired (i.e., has a boost torque been outputted, as shown in step 92 of flow chart 70), or (ii) the vehicle's throttle rate has fallen below a certain predetermined threshold value. If neither condition (i) nor condition (ii) has occurred, controller 40 proceeds to step 110 and does not disarm the boost enable flag. Otherwise, if either of the conditions (i) or (ii) has occurred, controller 40 proceeds to step 112 and disarms the boost enable flag. In this manner, the system 10 ensures that the "boost torque" signal is not unnecessarily "fired" or outputted repeatedly over a relatively short period of time.

It should be appreciated that by monitoring and reacting to changes in the vehicle's throttle rate, the present control system 10 "anticipates" vehicle acceleration/slip and is able to provide an improved response and improved slip and traction control in situations which are not accounted for in prior systems (e.g., short "bursts" of acceleration or deceleration), while substantially preventing undesirable NVH problems. It should further be appreciated that the other control and/or slip prevention subroutines and/or strategies may be used in conjunction with the strategies and/or subroutines described herein.

It is understood that the various inventions are not limited to the exact construction illustrated and described above, but that these previously delineated inventions may be varied without departing from the scope of the inventions as described in the following claims.

What is claimed is:

1. A system for controlling a transfer case which is operatively disposed within a four-wheel drive vehicle of the type having a selectively positionable throttle and a front and a rear driveshaft, said transfer case being effective to selectively transfer torque to said front driveshaft and to said rear driveshaft, said system comprising:

a first sensor which senses a first and a second position of said throttle and which generates at least one signal representing said sensed first and second position;

a second sensor which measures a speed of said front driveshaft and which generates a second signal based upon said speed of said front driveshaft;

a third sensor which measures a speed of said rear driveshaft and which generates a third signal based upon said speed of said rear driveshaft;

a controller which is communicatively coupled to said transfer case and to said sensor, and which receives said at least one signal and which utilizes said at least one signal to calculate a rate of change of throttle position, said controller being further adapted to selectively generate an output signal based upon said rate of change of throttle position, wherein said rate of change of throttle position is calculated over a first period of time, and wherein said controller is further adapted to calculate a second rate of change of throttle position which is calculated over a second period of time, and wherein said controller selectively generates said output signal further based upon said second rate of change of throttle position, said output signal being effective to selectively control said torque which is transferred to said front and said rear driveshafts, said controller being further adapted to receive said second signal and said third signal and to generate said output signal based further upon said second signal and said third signal, wherein said controller is further adapted to compare said rate of change of throttle position to a threshold value, and to generate said output signal only if said rate of change of throttle position exceeds said threshold value.

2. The system of claim 1 wherein said output signal comprises a unique one of a plurality of predetermined duty cycle values.

3. The system of claim 2 wherein said plurality of predetermined duty cycle values is stored within a table located within said controller.

4. The system of claim 1 wherein said controller is further adapted to compare said second rate of change of throttle position to a second threshold value, and to generate said output signal only when either said rate of change of throttle position exceeds said threshold value or said second rate of change of throttle position exceeds said second threshold value.

5. A method for controlling a transfer case which is operatively disposed within a four wheel drive vehicle of the type having a selectively positionable throttle which changes position by a certain amount during an interval of time, a front driveshaft and a rear driveshaft, wherein said front driveshaft rotates at a first speed and said rear driveshaft rotates at a second speed, and wherein said rate threshold value is equal to a first value if said first and said second speeds each exceed a threshold speed value, and is otherwise equal to a second value, said transfer case being adapted to selectively provide torque to said front driveshaft and said rear driveshaft, said method comprising the steps of:

measuring said certain amount;

using said certain amount to calculate a rate of change of said position of said throttle;

comparing said calculated rate of change of said position of said throttle to a rate threshold value; and selectively providing a boost torque signal to said transfer case when said rate of change of said position of said throttle exceeds said rate threshold value, said boost torque signal being effective to alter said torque provided to said front driveshaft and said rear driveshaft.

6. The method of claim 5 wherein said certain amount is measured by use of a throttle position sensor.

7. The method of claim 5 wherein said boost torque signal has a value which is based upon an amount by which said rate of change exceeds said rate threshold value.

8. The method of claim 5 further comprising the steps of: generating a minimum duty cycle signal, said minimum duty cycle signal having a value based upon a current position of said throttle;

comparing said boost torque signal to said minimum duty cycle signal; and providing said boost torque signal to said transfer case only if said boost torque signal exceeds said minimum duty cycle signal.

9. The method of claim 8 further comprising the step of:

providing said minimum duty cycle signal to said transfer case if aid minimum duty cycle signal exceeds said boost torque signal.

10. The method of claim 5 further comprising the steps of:

calculating a second rate of change of said position of said throttle over a second interval of time;

comparing said second rate of change of said position of said throttle to a second rate threshold value; and providing said boost torque signal to said transfer case when said second rate of change of said position of said throttle exceeds said second rate threshold value.

11. The method of claim 10 wherein said interval of time is equal to approximately 20 milliseconds and said second interval of time is equal to approximately 40 milliseconds.

12. A method for controlling a transfer case within a vehicle of the type having a front driveshaft, a rear driveshaft, and a throttle which may be selectively disposed in a plurality of positions, said transfer case being effective to selectively transfer torque to said front driveshaft and said rear driveshaft, said method comprising the steps of:

measuring a first speed value of said front driveshaft;

measuring a second speed value of said rear driveshaft;

measuring a first and second throttle position value;

providing a controller;

communicatively coupling said controller to said transfer case;

providing said first and second speed values and said first and second throttle position values to said controller;

calculating a minimum duty cycle signal based upon said first and second speed values, and a unique one of said first and second throttle position values;

calculating a throttle rate value by use of said first and second throttle position values;

selectively calculating a boost torque signal based upon said first and second speed values and said throttle rate value;

comparing said minimum duty cycle signal and said boost torque signal; and communicating the higher of said minimum duty cycle signal and said boost torque signal to said transfer case, effective to cause said transfer case to alter said torque which is provided to said first and said second driveshaft.

13. The method of claim 12 wherein said minimum duty cycle signal and said boost torque signal each comprise a unique duty cycle value.

14. The method of claim 12 further comprising the step of:

comparing said throttle rate value to a predetermined threshold value; and wherein said boost torque signal is calculated only if said throttle rate value exceeds said predetermined threshold value.

15. The method of claim 12 further comprising the steps of:

comparing said throttle rate value to a first predetermined threshold value;

measuring a third throttle position value;

calculating a second throttle rate value by use of said first throttle position value and said third throttle position value;

comparing said second throttle rate value to a second predetermined threshold value; and wherein said boost torque signal is calculated only if said throttle rate value exceeds said first predetermined threshold value or if said second throttle rate value exceeds said second predetermined value.

* * * * *